June 2, 1936.  J. FLAWS, JR., ET AL  2,042,520
APPARATUS FOR FEEDING WIRES FOR ELECTRIC LAMPS AND SIMILAR DEVICES
Filed Dec. 29, 1934   2 Sheets-Sheet 1
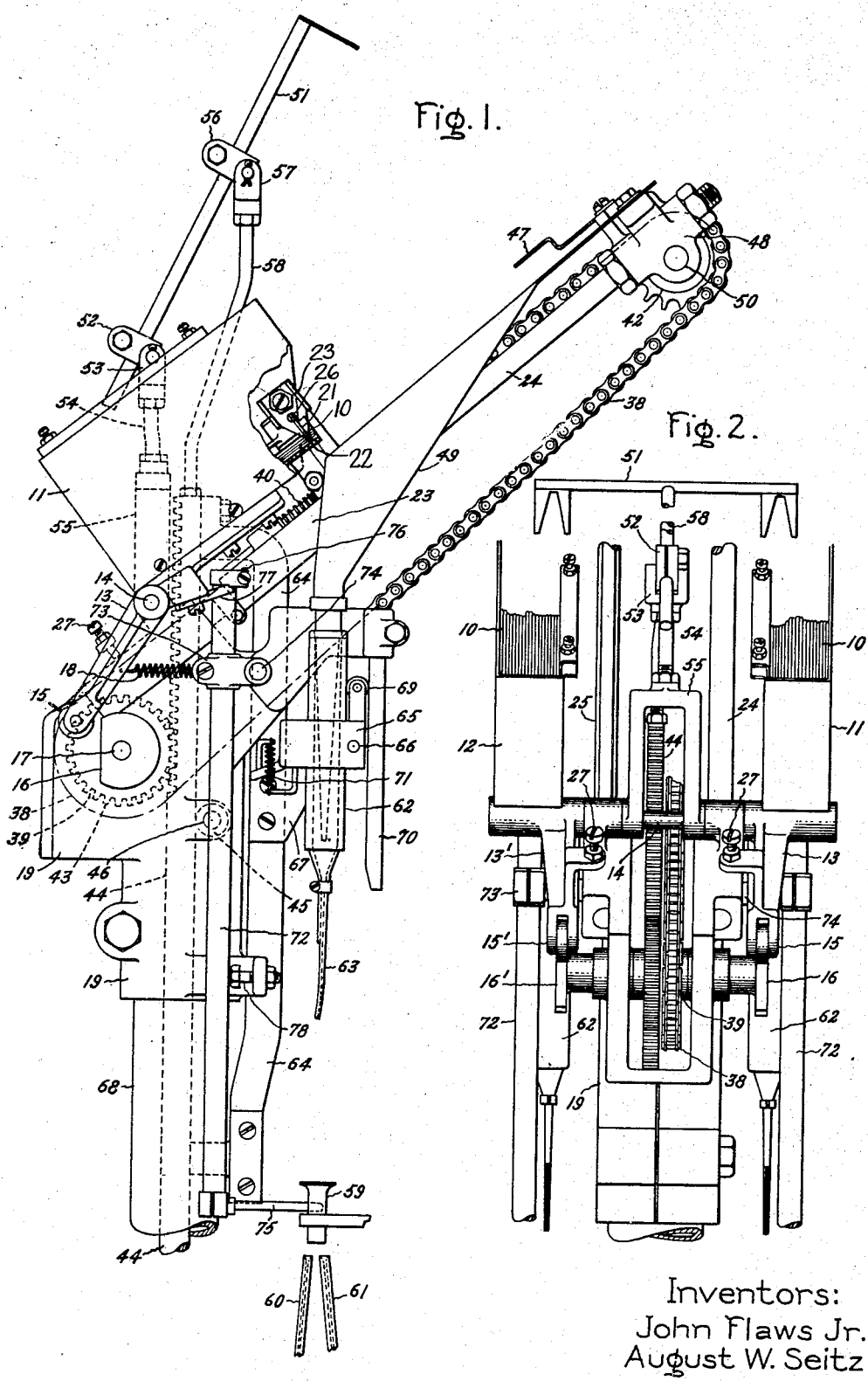
Inventors:
John Flaws Jr.,
August W. Seitz,
by Harry E. Dunham
Their Attorney.

June 2, 1936.  J. FLAWS, JR., ET AL  2,042,520
APPARATUS FOR FEEDING WIRES FOR ELECTRIC LAMPS AND SIMILAR DEVICES
Filed Dec. 29, 1934  2 Sheets-Sheet 2
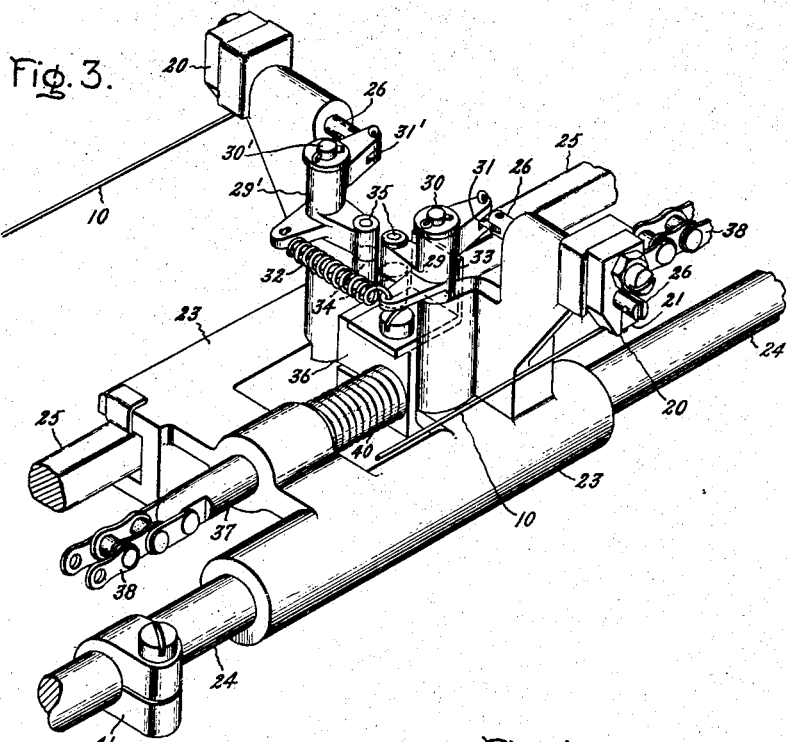
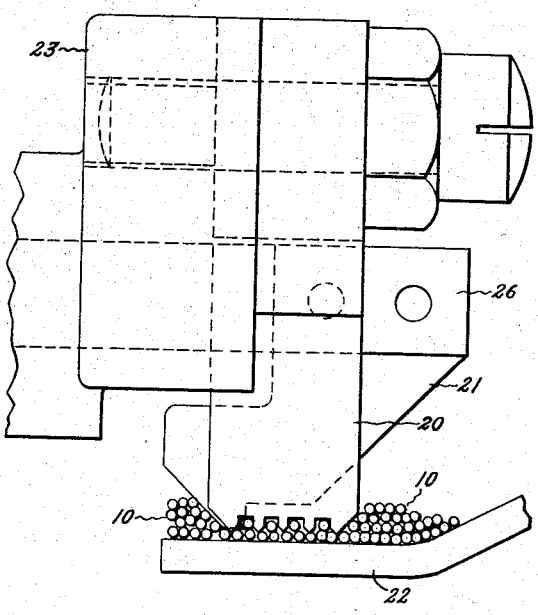
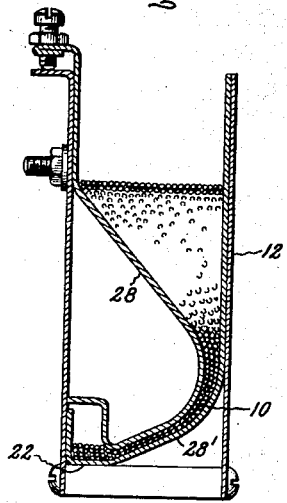
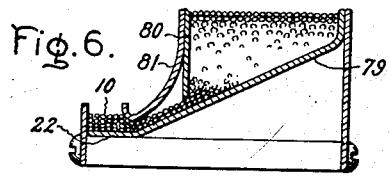
Inventors:
John Flaws Jr.,
August W. Seitz,
by Harry E. Dunham
Their Attorney.

Patented June 2, 1936

2,042,520

UNITED STATES PATENT OFFICE 2,042,520

APPARATUS FOR FEEDING WIRES FOR ELECTRIC LAMPS AND SIMILAR DEVICES

John Flaws, Jr., Cleveland Heights, and August W. Seitz, Euclid, Ohio, assignors to General Electric Company, a corporation of New York Application December 29, 1934, Serial No. 759,708

6 Claims. (Cl. 140—132)

Our invention relates to apparatus for feeding lengths of wire and more particularly to apparatus for feeding lengths of wire to a machine for making lamp stems and other similar articles. The lengths of wire used are usually composed of three parts welded together and are characterized by small knobs, knots or rough portions about the welds. These features make it difficult to feed the wires as the welds of the wire being fed catch and snag similar welds on the other wires, disrupting the pile of wires and often causing more than one wire to be fed at a time. Our apparatus follows the general construction design of the apparatus shown in Patent 1,867,418, issued to Müller et al. on July 12, 1932, although it is provided with different hoppers, pick-up jaws and other improvements.

One object of our invention is to provide apparatus that will feed one wire at a time consistently. Another object of our invention is to provide wire feeding apparatus that will not be affected by "knotty" welds or other rough surface conditions of the wires. Another object of our invention is to provide a wire feeding mechanism which is particularly adapted to feed and guide the wire between parts of a stem making machine to the wire supporting parts thereof. Other features and advantages of our invention will be apparent from the detailed description which follows of one species thereof and from the drawings.

In the drawings, Fig. 1 is a side elevation of the wire feeding apparatus of our invention; Fig. 2 is an end view of a portion thereof; Fig. 3 is a perspective view of the slider and pick-up jaws thereof; Fig. 4 is a side view on an enlarged scale of the pick-up jaws in the pick-up position; Fig. 5 is a section through one of the wire holding hoppers; and Fig. 6 is a section through a portion of a modified wire hopper.

The wire feeding apparatus of our invention shown in Figs. 1 and 2 is composed of two sections, each of which feeds a wire length from a pile thereof to one head of a stem machine (not shown) located before it. The stem machine is preferably of the type disclosed in Fagan and Staudenmeier Patent No. 1,655,141, the heads of which move in such a manner as to take positions before each section of our feeding mechanism in turn for an interval of time permitting a wire from each section to be placed in each head.

The wire lengths 10 are fed from piles in hoppers 11 and 12 in which they are arranged in parallel. The hoppers are each mounted on an arm of levers 13 and 13' respectively, which are pivotally mounted on rod 14 and hold the hoppers in an inclined position so that the wires rest against the back thereof and are kept in order. As the operation cycle begins, the hoppers are held in one position by engagement of rollers 15 and 15' of levers 13 and 13' with cams 16 and 16' respectively on shaft 17. A spring 18 connected between lever 13 and the frame 19 causes the roller 15 to follow the cam and a similar spring (not shown) causes roller 15' to follow cam 16'. The frame 19 supports rod 14 and shaft 17 which in turn support said levers and cams.

Pairs of pick-up jaws 20 and 21 (Fig. 3) are now moved into position above lips 22 formed by the bottom of each hopper adjacent the open end thereof. Jaw 20 of each pair is attached directly to a slider 23 mounted on rods 24 and 25 which extend in an inclined position from the frame 19 and the co-acting jaws 21 are each attached to a rod 26 held by the slider and are located within a groove in jaw 20. A series of transverse grooves are provided in the end of jaws 20 which lie parallel to the axis of the wires in the hoppers and which are only large enough to hold one of said wires. The wires are carried into the grooves in the jaws by an upward movement of the hoppers which is brought about by the indexing of lower portions of cams 16 and 16' into position below rollers 15 and 15'. The limit of movement of each hopper is reached when screw 27 strikes a portion of the frame. Each pair of jaws engages only those wire lengths resting on the lip 22 of the hopper as said hopper is provided with a dividing plate or partition 28 which forms an inclined sub-bottom on which the bulk of the wire lengths are held and which in connection with the bottom 28' partitions off a path leading therefrom to the lip. The wire lengths pass onto the lip from the side as those on said lip are exhausted. This construction permits the pick-up jaws to engage a quantity of wire lengths from the top and keeps the top plane of the wires on the lip substantially constant. The wires maintain a loose and untangled condition on the lip during the feeding operation and do not stick together when fed, as often happens with the apparatus shown in the patent hereinbefore referred to, which permits the main body of wires to rest on the wire being fed. Jaws 21 are now moved sideward catching in each case the first wire intercepted in the grooves of jaw 20. This movement is caused by levers 29 and 29' which are mounted on pins 30 and 30' respectively extending from the slider 23 and are connected through the links 31 and 31' to rods 26—26. The spring 32 which extends between arms of the levers 29 and 29' causes the movement to occur when the flange of the strip 33 is moved away from the rollers 34 on pins 35 in each of the levers 29 and 29'. The strip 33 is attached through the block 36 to the rod 37 which is slidably mounted in slider 23 and is moved by a clockwise rotation of shaft 17 to which it is connected through chain 38 and a sprocket (indicated at 39). As the shaft is rotated the tension on the chain is relieved and the spring 40 forces the block 36 back closing the jaws. A former counter-clockwise rotation of shaft 17 created the tension in spring 40 since downward movement of the slider 23 is prevented by the collar 41 which is attached to rod 24. Immediately after the jaws are closed the rollers 15 and 15' pass off the high part of cams 16 and 16' and the hoppers are lowered away from the jaws. Further rotation of the shaft causes the remainder of the chain which passes over sprocket 42 and is connected to the other end of rod 37 to move the slider 23 upward on rods 24 and 25. The shaft 17 is turned through engagement of gear 43 thereon with the rack cut in rod 44 which is operated vertically by mechanism not shown. The roller 45 on pin 46 in the frame keeps the rack in engagement with the gear.

The upward limit of movement of the slider is reached as the rollers 34—34 strike the end of metal strip 47 extending from bracket 48 which causes the wire lengths carried thereby to be released. The released wire lengths fall into the open ends of the funnels 49 held by bracket 48. The bracket 48 is mounted on rods 24 and 25 and supports the shaft 50, to which sprocket 42 is attached. It is important that the end of the wire gripped by the pick-up jaws follows the other end of the wire down the chute as the composition of each end of the wire lengths differs. This order of movement is assured by a guide or rake 51 which moves down onto the free end of the wire lengths extending from the pick-up jaws as they are released therefrom. The rake 51 loosens those wire lengths that tend to stick in the jaws and also guides the wires into the chutes and prevents them from somersaulting. The rake 51 is attached through block 52, yoke 53, rod 54 and yoke 55 to rod 14 about which yoke 55 turns as the rake is operated by rack 44 to which it is attached through block 56, yoke 57 and rod 58.

In each case the wire length passing down the funnel 49 must be directed through the jaws and other mechanism of the stem machine as well as through the flare 59 and to the relatively small opening in one of the holders 60 and 61 of the said machine. In the instance shown in Fig. 1 the wire length is directed into holder 60 by means of the guide tube 62 which is moved down as the slider passes upward until the tip 63 thereof lies within the flare 59 and is just above the open end of said holder. This movement of the guide tube is produced by a similar movement of rack 44 from which the bow shaped bar 64 extends and on which the guide tube is pivotally mounted through block 65, pin 66 and bracket 67. The frame 19 and tube 68 on which it is mounted are slotted to permit full movement of the bar 64. The pivoted feature of the guide tube permits the tip 63 thereof to swing against the flare on taking a position therein and prevents said flare from being displaced by being struck by said tip as it is lowered. In the case shown in Fig. 1, the block 65 is provided with a roller 69 on a pin in an arm extending therefrom and turns about pin 66 as said roller passes onto the lower cam surface of rod 70. The roller is kept against the rod by spring 71 which extends between posts in bracket 67 and block 65. The rod 70 is mounted in a portion of the frame 19. The other guide tube associated with the other wire fed is similarly constructed although the tube is made to turn in a counter-clockwise direction instead of clockwise, so the wire length will be directed into the holder 61 of the stem machine head located before it. The tips 63 in each case are characterized by an open section near the end which prevents the wire lengths from being disturbed as the tips are withdrawn. The wall of the flare guides the wire lengths as they pass the open section of the tip 63.

Automatic means are provided for controlling the operations of each section of our apparatus so the stem machine may be operated as long as there are stems in the course of manufacture. The means provided for each of the wire feeding sections of our apparatus comprises a rod 72 pivotally mounted on the frame 19 through bracket 73 and pin 74. The rod 72 is provided with a flinger 75 which strikes the flare 59 as the stem head takes a position before the device and causes the rod to swing so that a portion of the collar 76 thereon moves to one side of the arm 77 extending from lever 13. If no flare should be engaged by the finger 75, the collar will not be moved and the hopper will be kept from moving upward as required to place the wire lengths in the pick-up jaws. In the rest position rod 72 engages the head of bolt 78 extending from the frame.

The features of the hoppers shown in connection with the apparatus described may also be incorporated in other hoppers such as the modification shown in Fig. 6. In this instance the bottom 79 of the hopper is extended to one side and forms the lip 22 from which the wires are taken. An opening below hopper side 80 permits the wires to pass along the inclined bottom thereof to the lip and a plate 81 fastened to hopper side 80 guides the wires to said lip.

What we claim as new and desire to secure by Letters Patent of the United States is:

1. In an apparatus for feeding wires, the combination of a hopper adapted to hold a quantity of wires, a pair of jaws adapted to grip only a single wire mounted above a portion of the hopper, means for raising said hopper to thrust said pair of jaws into the wires carried by said hopper, means for causing a relative movement of said jaws to cause one wire to be gripped therebetween, means for lowering said hopper away from said jaws so as to free the wire gripped thereby from the other wires, means for moving said jaws to and from a delivery position and means for moving said jaws relative to each other at the delivery position to release the wire carried thereby.

2. In an apparatus for feeding wires, the combination of a hopper adapted to hold a quantity of wires, said hopper having a sloping bottom with a portion extending sideward forming a lip and a plate mounted above at least a portion of the inclined surface of the bottom forming a passage way therebetween of lesser width than the hopper so that only a few of the wires may pass therethrough to the lip at one time, a pair of jaws adapted to grip only a single wire mounted above the lip and adapted to be moved to and from a delivery position, means for causing a relative movement of said jaws and said hopper to carry the wires into operative relation to the jaws and means for causing a movement of said jaws relatively to each other to cause a wire to be gripped at the hopper position thereof and to be released at the delivery position.

3. In an apparatus for feeding wires, the combination of a hopper adapted to hold a quantity of wires, a pair of jaws mounted above a portion of the hopper, one jaw of which is provided with a groove in one face thereof parallel to the axis of the wires in the hopper and only large enough to hold one wire and the other jaw of which is mounted adjacent said first-mentioned jaw and movable with respect thereto, means for raising said hopper to thrust the grooved face of the first-mentioned jaw into the wires therein, means for causing a wire then located in the groove of said jaw to be gripped by moving said second-mentioned jaw with respect to the other jaw until movement thereof is arrested by the wire in the groove of the other jaw, means for lowering said hopper away from the jaws to free the wire held by the jaws from the other wires and means for moving said jaws to and from a delivery position and for separating said jaws at the delivery position to release the wire.

4. In an apparatus for feeding wires, the combination of a hopper adapted to hold a quantity of wires, a pair of jaws mounted above a portion of the hopper, one jaw of which is provided with a plurality of grooves in one face thereof parallel to the axis of the wires in the hopper, each groove being only large enough to hold one wire and the other jaw of which is mounted adjacent said first-mentioned jaw and movable with respect thereto, means for raising said hopper to thrust the grooved face of the first-mentioned jaw into the wires therein, means for causing a wire located in one of the grooves of said jaw to be gripped by moving the second-mentioned jaw with respect to said grooved jaw, said jaw passing successively through the positions taken by wires when located in each of the grooves of said jaw until the movement thereof is arrested by a wire in one of said grooves, means for lowering said hopper away from the jaws to free the wire held by the jaws from the other wires and means for moving said jaws to and from a delivery position and for separating said jaws at the delivery position to release the wire.

5. In an apparatus for feeding wires, the combination of a hopper adapted to hold a quantity of wires, a pair of jaws adapted to grip only a single wire mounted above said hopper, means for causing said jaws to engage a wire in the hopper and to grip it, means for moving said jaws from said position above the hopper to a delivery position and return, a funnel located below the pairs of jaws at the delivery position thereof, means for opening the pairs of jaws at the delivery position to release the wire carried thereby so that it may fall into said funnel, a guide tube mounted below the funnel adapted to receive the wire therefrom, means for raising and lowering the guide tube intermittently to carry it to a position adjacent one end of a holder periodically indexed in and out of position before it and means for swinging the lower end of said guide tube sidewise to align the end thereof with an end of said holders so as to direct the wire passing therethrough to said holder.

6. In an apparatus for feeding wires, the combination of a hopper adapted to hold a quantity of wires, a pair of jaws adapted to grip only a single wire mounted above said hopper, means for causing said jaws to engage a wire in the hopper and to grip it, means for moving said jaws from said position above the hopper to a delivery position and return, a funnel located below the pairs of jaws at the delivery position thereof, means for opening the pairs of jaws at the delivery position to release the wire carried thereby so that it may fall into said funnel, a guide mounted adjacent the delivery position of the pair of jaws, means for moving said guide down onto one end of the wire carried by the pairs of jaws as it is released therefrom to loosen said wire and to guide said wire into the funnel and a guide tube mounted below said funnel adapted to receive the wire therefrom and to direct it to holding means periodically indexed into position before said tube.

JOHN FLAWS, Jr.
AUGUST W. SEITZ.